(No Model.)
J. T. B. SELMAN.
FILTER.
No. 569,065. Patented Oct. 6, 1896.
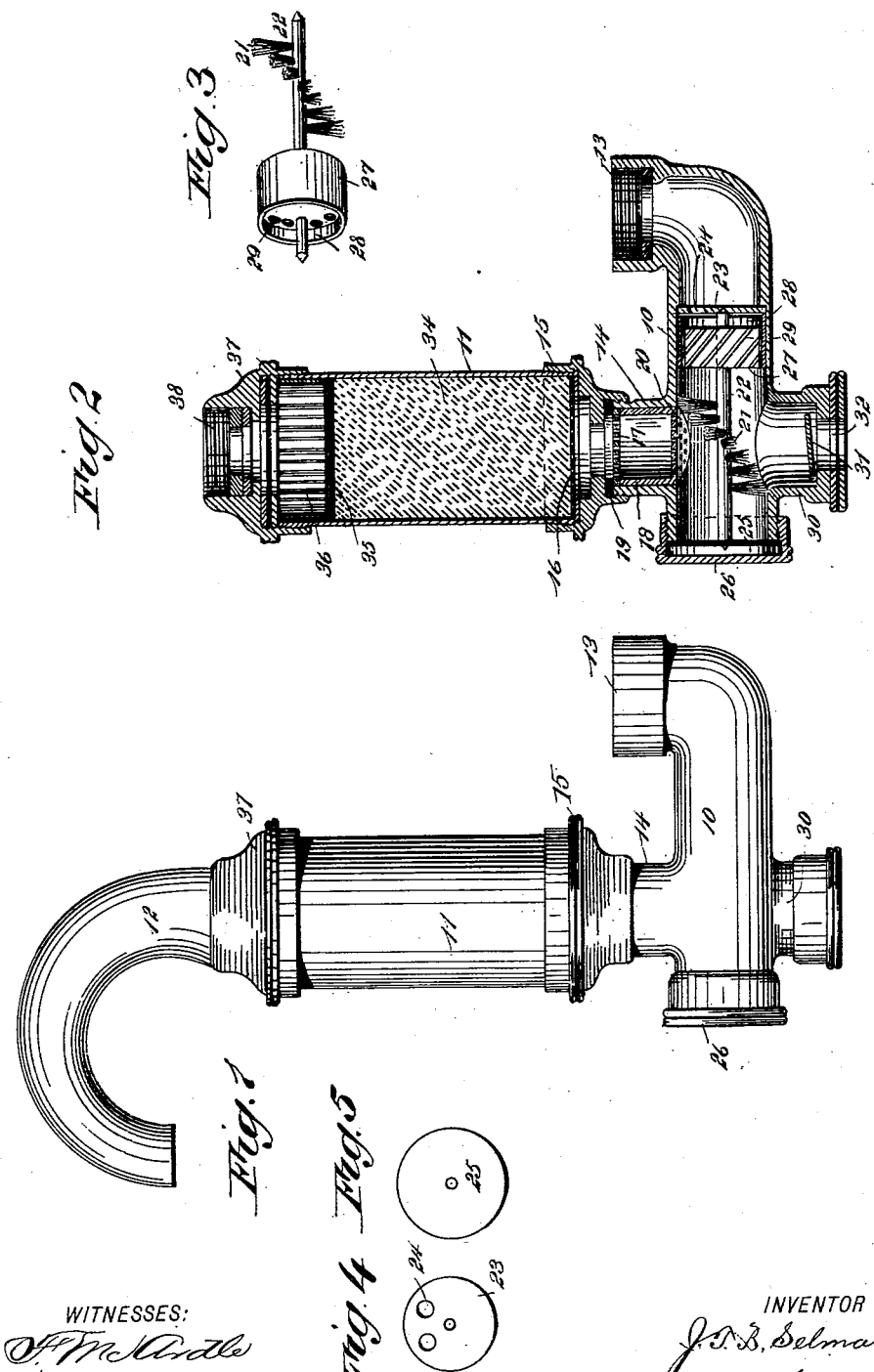
WITNESSES:
F. McArdle
N. P. Hutchinson
INVENTOR
J. T. B. Selman
BY
Munn & Co
ATTORNEYS.

UNITED STATES PATENT OFFICE.

JOSEPH T. B. SELMAN, OF TORONTO, CANADA.

FILTER.

SPECIFICATION forming part of Letters Patent No. 569,065, dated October 6, 1896.

Application filed November 22, 1894. Serial No. 529,617. (No model.)

*To all whom it may concern:*

Be it known that I, JOSEPH T. B. SELMAN, of Toronto, in the Province of Ontario and Dominion of Canada, have invented a new and Improved Filter, of which the following is a full, clear, and exact description.

My invention relates to improvements in filters, and the object of my invention is to produce a very simple and comparatively inexpensive filter which may be conveniently attached to an ordinary service-pipe, which is provided with automatic mechanism which makes it self-cleaning, and which may be very easily taken apart or put together whenever it is necessary to do either of these things.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a side elevation of the filter embodying my invention. Fig. 2 is a central vertical section of the same with the spout removed. Fig. 3 is a detail view of the water-motor and its shaft, this device being used to operate the cleaning-brush. Fig. 4 is a detail view of one of the bearing-disks for the motor-shaft, and Fig. 5 is a detail view of the other or outer bearing-disk for the shaft.

The filter comprises three main parts, to wit: The T 10, which connects with the service-pipe, the main barrel 11, containing the greater part of the filtering material, and the discharge-spout 12, which is curved, as shown in Fig. 1, and is connected, as hereinafter described, to the top of the main barrel 11. The T 10 has one end preferably bent up and screw-threaded, as shown at 13, this being the inlet of the filter and adapted to connect with an ordinary service-pipe. The T has also an upper member 14, which is screwed to the cap 15 of the barrel 11, which barrel has a screen 16 at the bottom to retain the filtering material. In the member 14 is placed an auxiliary filter comprising a tube 18, which fits tightly in the member 14 and has an arched perforated bottom 20 and a perforated cover-plate 17 for the tube. The cover-plate 17 fits against the tube top and against a washer 19, which abuts with a shoulder $19^a$ in the cap 15. The tube 18 may be filled with any suitable filtering material.

Arranged longitudinally in the T 10 and beneath the screen 20 is a revoluble brush 21, having a spiral row of bristles, and which, as it turns, is adapted to wipe the entire surface of the screen 20 and so keep the screen clean, and the shaft 22 of this brush is at one end journaled in a disk 23, which is held in the T and is provided with holes 24 for the passage of water, and the other end of the shaft is pivoted in a disk 25, which is held against the end of the T 10 by a screw-cap 26.

The shaft 22 is driven by a small motor or propeller 27, which turns snugly in the T 10, and this motor is recessed at one end, as shown at 28, to provide a water-space, and is provided also with diagonal bores 29, and the water which passes through the holes 24 in the disk 23 is confined in the space 28 and then rushes under pressure through the bores 29, thus turning the motor, the shaft 22, and the brush 21. I do not confine myself to this particular form of motor, as it will be understood that any equivalent motor or propeller may be substituted without changing the principle of the invention.

The lower portion 30 of the T has its passage 32 controlled by a valve 31, which is arranged within the said portion 30, and under normal conditions the pressure of water from within holds the valve closed, but when the water in the service-pipe is turned off the water in the filter runs out beneath the valve 31, which is arranged so as to open slightly, and, if desired, may be pressed slightly by a spring.

The main body 34 of filtering material is held in the main barrel 11 and is confined between the lower screen 16 and the upper screen 35, this being held down by the corrugated bushing 36, and the latter is held in place by a cap 37, which is provided with a central bore and has a suitable washer inserted between it and the main barrel. The cap 37 is screw-threaded at the top, as shown at 38 in Fig. 2, suitable washers or gaskets are placed in the bore, and the discharge-spout 12 is screwed down upon the gasket, thus making a water-tight joint.

In using the filter the inlet end 13 of the T 10 is screwed to an ordinary faucet or service-pipe, and then when the water is turned on it passes through the holes 24 of the disk 23 and also through the motor 27, which it sets in motion, and from the T the water passes up through the filtering-beds 18 and 34 and out through the spout 12. As the water passes toward the filter the brush 21 is revolved in the manner already described, thus automatically removing the impurities from the screen 20, so that the filter is not clogged, and when the water not needed is turned off the valve 31, which has been kept closed by the heavy water-pressure, opens slightly, as shown in Fig. 2, and the dirty water runs out beneath the valve.

Having thus described my invention, I claim as new and desire to secure by Letters Patent—

The combination, with the T and the filtering mechanism connected therewith, of the filtering-screen in the outlet of the T, the revoluble brush beneath the screen, the motor on the brush-shaft, the disks forming the bearings of said shaft, the inner disk being perforated, and the valve-controlled member below the brush, substantially as described.

JOSEPH T. B. SELMAN.

Witnesses:
A. DOOLE,
E. C. PERRY.